(12) United States Patent
Post, II et al.

(10) Patent No.: US 7,984,915 B2
(45) Date of Patent: Jul. 26, 2011

(54) REAR SUSPENSION WITH SEMI-ACTIVE TOE FORCE COMPLIANCE CONTROL

(75) Inventors: James W. Post, II, Dublin, OH (US); John Markoski, South Lyon, MI (US); Klaus Kramer, Neuenkirchen (DE)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 12/464,544

(22) Filed: May 12, 2009

(65) Prior Publication Data

US 2010/0289229 A1 Nov. 18, 2010

(51) Int. Cl.
*B62D 17/00* (2006.01)
(52) U.S. Cl. ............... 280/5.524; 280/124.128; 280/5.5; 280/86.75; 280/5.522; 701/37
(58) Field of Classification Search ............... 280/5.524, 280/5.52, 5.522, 5.523, 5.521, 86.758, 86.757, 280/124.128, 5.5, 86.75, 90; 701/37
See application file for complete search history.

(56) References Cited

U.S. PATENT DOCUMENTS

| | | | |
|---|---|---|---|
| 4,706,989 A | | 11/1987 | Iijima et al. |
| 4,930,805 A | * | 6/1990 | Takata et al. ............ 280/124.128 |
| 6,907,975 B2 | * | 6/2005 | Doremus et al. ............ 192/85.51 |

FOREIGN PATENT DOCUMENTS

| | | |
|---|---|---|
| DE | 3703618 | 8/1988 |
| GB | 2163104 | 2/1986 |
| WO | 2009124543 | 10/2009 |

OTHER PUBLICATIONS

European Search Report of European Patent Application No. 10156945.7 dated Apr. 19, 2010.

* cited by examiner

*Primary Examiner* — Ruth Ilan
*Assistant Examiner* — Keith Frisby
(74) *Attorney, Agent, or Firm* — Mark E. Duell; Rankin Hill & Clark LLP

(57) ABSTRACT

Herein, a particular vehicle suspension control arm in a suspension having multiple control arms is designed to create a range of available axial stiffness levels which relates to a range of toe change at the wheel under to lateral loading. In particular, a semi-active device is arranged on a given suspension control arm to allow a change in stiffness that produces a desirable amount of toe change under the presence of lateral loading. This suspension arrangement, when applied to the rear axle of an automobile, has significant merit in being able to enhance maneuverability and stability over a large range of operating conditions at a minimal level of control input energy and with robust failsafe operation.

16 Claims, 4 Drawing Sheets

REAR SUSPENSION WITH SEMI-ACTIVE TOE FORCE COMPLIANCE CONTROL

BACKGROUND OF THE INVENTION

In the field of vehicle dynamics, the design and specification of a suspension system includes many different tradeoffs, such as ride comfort vs. stability. In addition to this, the performance of a vehicle with respect to various operational parameters such as loading, vehicle speed, vehicle condition, etc. must be considered. Usually suspensions end up being a compromise between a wide variety of attributes that include both performance as well as cost/weight constraints.

Recently, in the design and manufacture of suspension systems, there has been a promulgation of active systems such as those including controllable dampers, controllable air springs, and active wheel toe change. Active wheel toe change is used to steer either the front or rear wheels via a control signal derived from various chassis sensors (lateral acceleration, steering angle, etc.) in order to change lateral and yaw response characteristics either to improve stability or to create unique response traits for a given vehicle concept. These active systems are generally more costly than a pure passive suspension, require considerable power in order to create activation, and are subject to failsafe risks requiring them to have highly developed fault risk protection systems in order to be deployed safely in chassis application.

What is needed is a system that can produce similar changes in vehicle response behavior without large requirements for control power and the development intensive challenges related to failsafe and control logic.

BRIEF SUMMARY OF THE INVENTION

Suspensions are designed in view of a variety of constraints including cost, weight, packaging, load management, etc. The analysis of a given passive suspension type can reveal the critical characteristics that lead to toe change under the presence of vertical wheel travel (also known in the art as kinematic toe change) or that arising from lateral loading on the suspension (lateral force toe change).

In the present suspension, the effects of kinematic toe change are negated. However, the geometric arrangement of control arms coupled with stiffness characteristics of bushings that link the control arms to the body and the wheel carrier (hub) can significantly change the amount of toe change under the presence of lateral loading forces generated by a tire during cornering. A re-design and orientation of a particular suspension's layout can be optimized to take advantage of this relationship by stressing the importance of bushing stiffness at a small number of points that, when changed, can significantly change the toe characteristics of the suspension under lateral tire force loading.

The present vehicle suspension includes a hub for supporting a vehicle wheel, a trailing arm secured to the hub and also secured to the body of the vehicle, a first lateral arm located, relative to the vehicle, rearward of the rotational axis of the wheel, the first lateral arm being secured to the hub and also secured to the vehicle body and being generally transverse to the longitudinal axis of the vehicle, and a second lateral arm located, relative to the vehicle, upward of the rotational axis of the wheel and upward of the first lateral arm, the second lateral arm being secured to the hub and also secured to the vehicle body and being generally transverse to the longitudinal axis of the vehicle.

The present suspension also includes a third lateral arm located, relative to the vehicle, forward of the rotational axis of the wheel, the third lateral arm being secured to the trailing arm and also secured to the body of the vehicle and comprising a variable stiffness actuator, wherein the variable stiffness actuator includes a hydraulic circuit with an electronically controlled orifice where the open state of the orifice provides a fluid flow state in the actuator such that the third lateral arm is in a least stiff state, thus, affecting toe properties of the vehicle wheel.

These and other features, aspects and advantages of the present invention will be fully described by the following description, appended claims, and accompanying drawings.

DETAILED DESCRIPTION OF THE INVENTION

Figure 1:
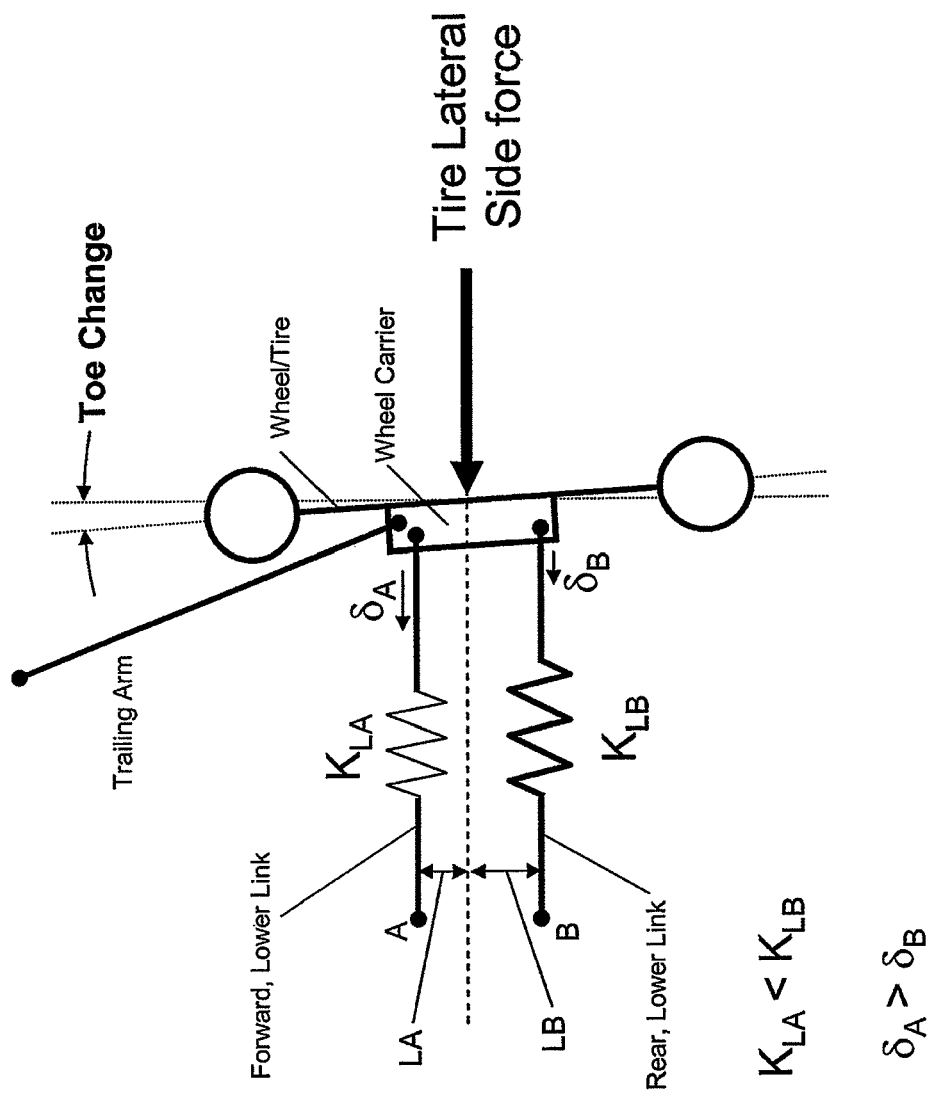
FIG. 1 is a schematic force diagram of a portion of a vehicle rear suspension.

FIG. 1 shows the conceptual arrangement of a trailing arm rear suspension, at the rear passenger wheel, with two lateral support links and a mainly, longitudinally mounted trailing arm. The lateral links indicated by springs in the diagram (left hand sides indicated by points A, B) represent the combination of a nearly solid link plus a source of compliance such as a rubber bushing at either end or just one end of each link. They connect the wheel carrier on the right side to the vehicle body or sub-frame attachments (points A, B).

Of interest to this arrangement is the manner in which the wheel carrier moves in response to a tire side force applied laterally at nearly the center of the wheel carrier (indicated in the figure as an inward force). By locating the forward lower lateral link closer to a transverse hub axis than the rearward lower lateral link and providing a lower spring coefficient within the forward lower lateral link as compared to the rearward lateral link, the lateral force of the tire produces a prescribed amount of toe-in of the wheel carrier (the deflection represented by $\delta_A$ exceeds $\delta_B$). Both the spring rates and distances LA and LB are determined via experimentation to provide a robust mechanism for achieving a desired toe change with changes in lateral load. The trailing arm may be either rigidly mounted to the wheel carrier, may have a joint at the interface or may employ a connection through a rubber bushing wherein small relative motions of the knuckle with respect to the trailing arm may occur. It is also helpful, but not necessary, for the forward end of the trailing arm to be attached to the vehicle body through a bushing with a relatively low lateral and longitudinal rate so as not to the restrict the motion of the combined wheel carrier and trailing arm assembly.

The lateral arm spring rates of the forward and rearward arm may be selected appropriately to achieve a prescribed amount of wheel carrier toe change under a given lateral load. It is also helpful that the effective arm stiffness of the rear lateral arm is higher than the front lateral arm (i.e. $K_{LB} > K_{LA}$). This, along with the difference in length of longitudinal distances LA and LB, creates a robust mechanism for achieving the desired toe change with lateral load.

Figure 2:
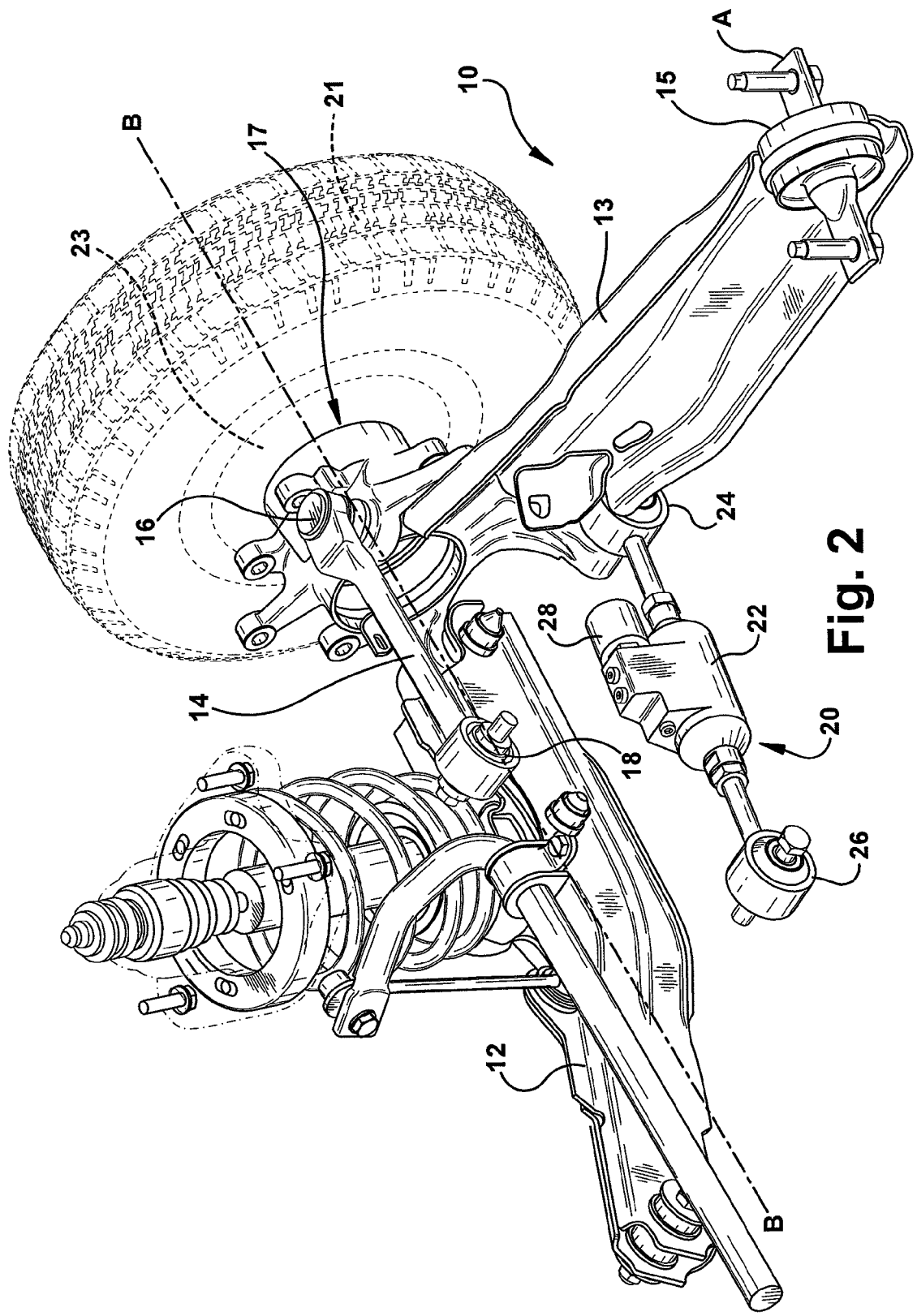
FIG. 2 is a close up perspective view of a variable compliance actuator within a portion of a vehicle rear suspension.

FIG. 2 shows a representative suspension arrangement 10, around a rear wheel on the driver's side of a vehicle, that consists of a multilink construction with 3 supporting lateral control arms 12, 14 and 20. The forward attachment of a longitudinal trailing arm 13 to the body at point A incorporates a bushing 15 with a low lateral rate of movement, thus permitting lateral movement of the bolted knuckle/arm assembly 17 under lateral loading of the suspension. The trailing arm 13 may be oriented parallel to the longitudinal axis of the vehicle.

The rear lower lateral control arm 12 (which also supports load from a vertical spring) is designed to be stiff laterally so as to maintain high lateral rigidity in the contact patch of the tire 21. This is needed to support dynamic wheel load changes and to produce a quickly responding lateral force during driving. The rear lower lateral control arm 12 is located to the rear of a transverse axis B-B extending from the wheel hub 23, the control arm 12 location being comparable to the schematic location of the rearward lateral link in the conceptual suspension shown in schematic FIG. 1. The upper lateral support arm 14 is designed with a ball joint 16 on one end and a stiff bushing 18 on the other so as to provide stiff lateral support such that camber rigidity of the suspension can be maintained, also producing the generation of quick side forces at the tire contact patch. The upper 14 and lower 12 arms may be placed at any distance, vertically offset from the transverse B-B axis of the hub.

The suspension layout is designed to create a high sensitivity of the toe change at the knuckle to the stiffness change in a particular arm, namely the forward lower suspension arm 20. Forward suspension arm 20 is located forward of the transverse hub axis B-B (in a position similar to the forward lateral link in schematic FIG. 1). This location, in combination with the ability to change the arm stiffness relates strongly to the desired value of lateral force compliance toe change. In particular, the range of stiffness for the combined arm and the stiffness of its associated end bushings produces a vehicle dynamics change that is significant in the state of the art of vehicle dynamics.

Figure 3:
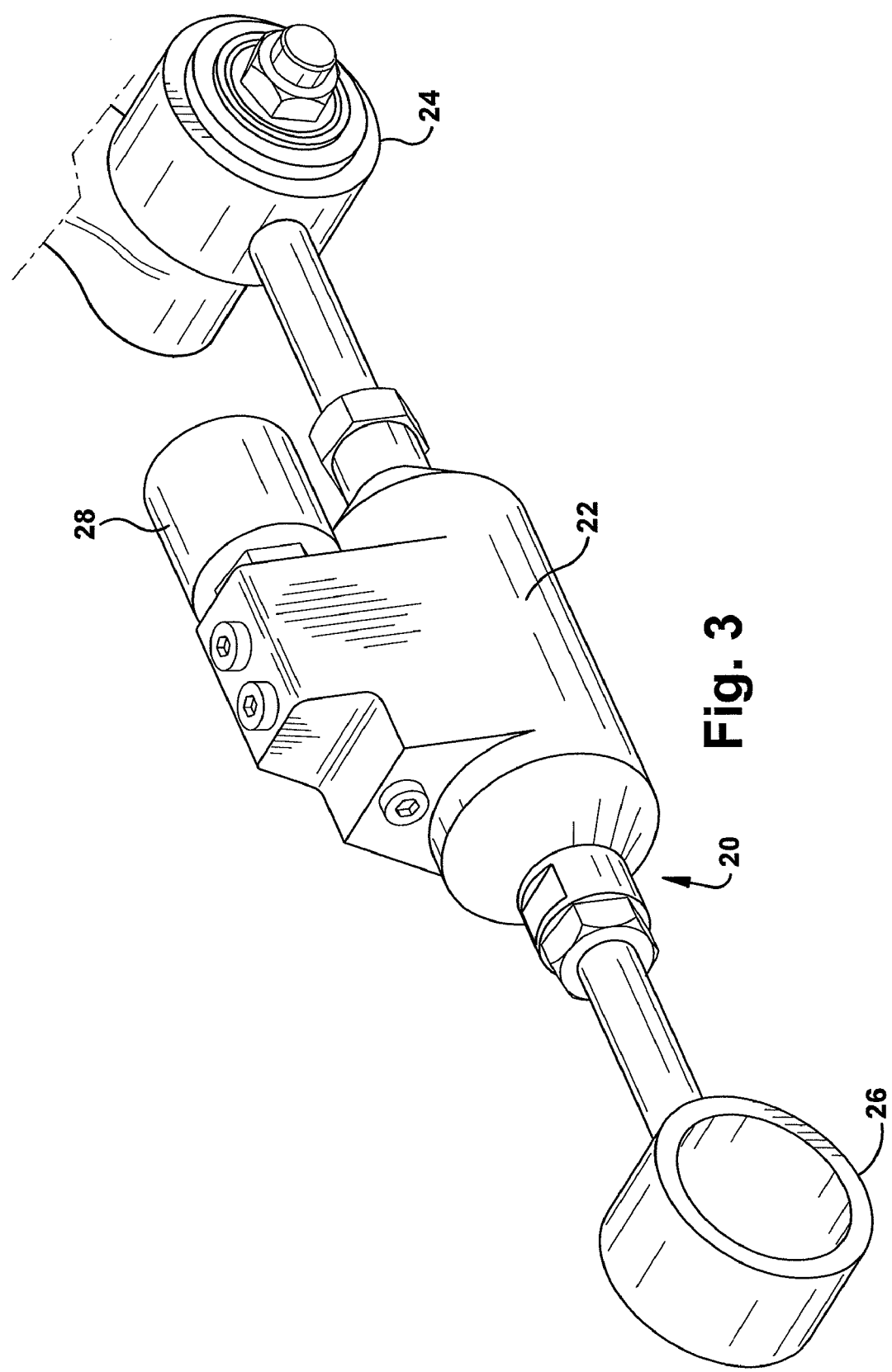
FIG. 3 is a perspective view of the variable compliance actuator.

Referring to FIGS. 2 and 3, the forward lower lateral arm 20 is an arm provided with variable compliance properties. It is comprised of a variable compliance actuator 22 at the center of the arm along with bushings in mounts 24 and 26 on either end. The inboard mount at point 26 is attached to the body itself or to a chassis sub-frame structure whereas the outboard mount at point 24 is connected to the trailing arm (or alternatively the knuckle itself). The actuator 22 situated in the arm 20 itself is capable of providing a base stiffness (lower end value) and a high stiffness (upper end value). The mechanism for creating this stiffness change is the throttling of hydraulic fluid between different chambers in the variable compliance actuator 22. In an electronically controlled orifice 27, a small, low power valve 28 is capable of either fully opening an orifice of the valve (allowing free flow of the fluid to one side or the other of a small piston within the device) or closing the valve fully (prohibiting flow of fluid from one side to the other). In the state of the valve 28 being open, the base stiffness of the arm is determined by the design of the internal, mechanical components of the variable stiffness device (spring rate) along with the selection of the bushing rates of the bushings in mounts 24 and 26 at either end of the variable stiffness control arm 20. With the valve 28 in the fully closed state, there is hydraulic lock of the valve and this allows a higher overall stiffness of the actuator 22 and thereby the arm 20. The high stiffness in the locked state is determined by the compliance of the internal, hydraulic circuit and seals of the device in the closed-valve state along with the stiffness of the bushing rates of the bushings in mounts 24 and 26 at either end.

Toggling between the two states (open and hydraulically locked) via actuation of the valve through electrical control creates states of stiffness that are between the soft (fully open) and hard (hydraulically locked) states. An electronic controller 30 is used to vary the valve state by providing electrical control signals to the electronically controlled, hydraulic valve 28. The overall hydraulic passage properties of the compliance actuator 22 in the middle of the control arm 20, the base stiffness of the compliance actuator (and surrounding structure) in the middle of the control arm 20 in the open state, and the end bushings in mounts 24 and 26 are selected in such a way as to achieve a certain range of toe change per unit of lateral force in the tire contact patch (lateral force toe compliance rate). The change in the lateral force toe compliance rate between the minimal value (stiff) and high value (soft) is sufficient to change the vehicle dynamics turning behavior in all regimes of vehicle speed and loading. Bushing stiffness is selected at the time of vehicle assembly.

The control parameters for deciding the desired stiffness of the semi-active compliance arm 20 are derived from existing sensor data already available from existing chassis control units such as Electronic Stability Control (ESC), Anti-lock Braking System (ABS), and/or a vehicle speed sensor 31, vehicle load sensor 32 or vehicle acceleration sensor 33, etc. In addition to this, height sensors, or alternatively, an algorithm capable of estimating vehicle loading condition, are used to change the toe compliance status depending on the estimated loading condition of the vehicle.

Figure 4:
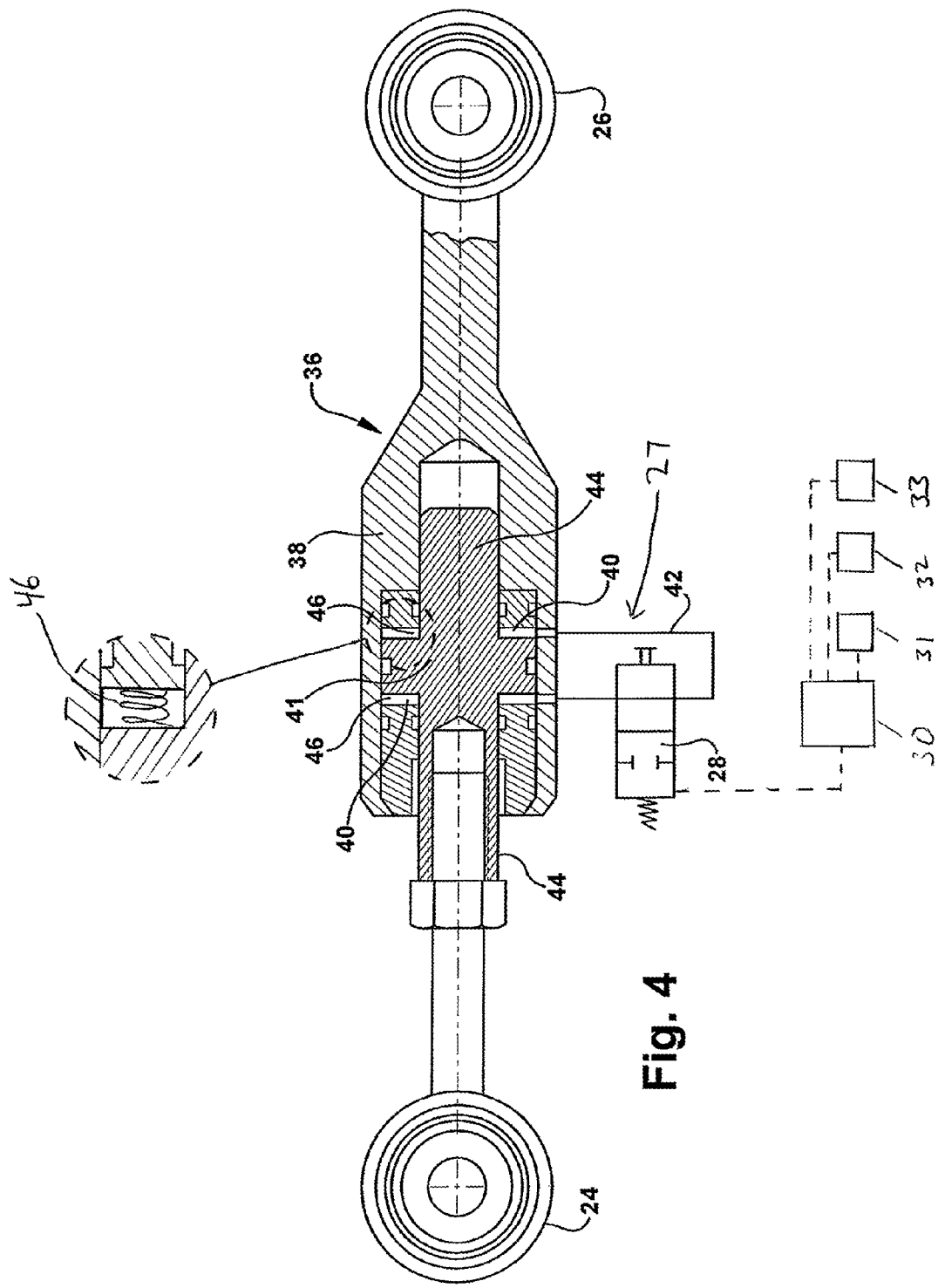
FIG. 4 is a schematic cross-sectional view of the variable compliance actuator.

FIG. 4 shows a schematic cut-away view of the compliance actuator 22 shown fully in FIG. 3. This element is a tube-shaped component with mounts used for fastening components which are to be attached to the element. The mounts 24 and 26 associated with the element each include a mounting eye and an inserted elastomer sleeve bushing. The sleeve bushings of the mounts include at least one metallic inner piece to be fastened to the component to be joined and one elastomer bearing body encasing the inner piece and fixed to the inner piece through vulcanization.

Within the region arranged between the mounts 24 and 26, the compliance actuator 22 comprises a piston cylinder system 36. In the interior of the cylinder 38 of the piston cylinder system 36 are at least two chambers 40 that receive hydraulic or pneumatic fluid and are separated from one another by the piston 41. The chambers 40 are connected to one another by a channel or connecting passage 42 containing the controllable valve 28. Depending upon the activation of the valve 28, the lower lateral arm 20 assumes a stiffness state. The state of maximum stiffness is when the valve 28 is closed, whereby this stiffness is almost exclusively determined by the stiffness of the mounts 24 and 26 with respect to the elastomer bushings therein, and whereby its stiffness can be reduced by a partial opening of the valve 28 in the passage 42 between the chambers 40 of the piston cylinder system 36.

The chambers 40 arranged for the hydraulic or pneumatic fluid within the cylinder 38 of the piston cylinder system 36 are connected by an external connecting passage 42. The valve 28 is inserted into the connecting passage 42 which passes through the cylinder wall in the vicinity of the chambers 40. By means of the valve 28, the connecting passage 42 between the chambers 40 is opened, closed, or the flow of the hydraulic medium can be continuously varied. As needed, the valve 28 can also be a valve which permits continuously variable regulation of flow in the range of states between closed and open. In this last instance, for example, the signals of acceleration sensors can be evaluated and used to control the valve.

By means of piston rod(s) 44, the piston 41 is guided within the piston cylinder system 36. One piston rod 44 is connected directly or indirectly to the first mount 24.

Cup springs 46 are arranged in each of the chambers 40. In the state of reduced stiffness of the compliance actuator 20, compared to the state of maximum stiffness, the total stiffness is influenced by the cup springs 46. The cup springs 46 each touch the piston 41 so that the piston 41 is elastically seated against the surfaces bordering the chambers. By this, a severe striking of the piston against the chamber walls is avoided in the event of imposition of high vibration amplitudes through the wheel.

In use, at low vehicle speeds, the control arm stiffness is set to a firm setting in order to enhance vehicle gain and responsiveness. The timing and activation of the inner/outer wheel (left or right wheel on a common axle) can be asymmetric in order to optimize the response. As speed increases, the actuation leads more towards a more nominally open or soft state where the actuator produces less vehicle gain by permitting more lateral force toe-in (and hence more understeer at the rear axle) and enables a margin for high speed stability and control.

As opposed to a single part, the trailing arm may be comprised of multiple arms. The trailing arm, in any form, may be at an angle, from parallel to 30 degrees offset from the longitudinal axis of the vehicle. The mounting sections 24 and 26, described as sleeve bushings may be replaced with ball joints or pillow joints.

Although the invention has been shown and described with reference to certain preferred and alternate embodiments, the invention is not limited to these specific embodiments. Minor variations and insubstantial differences in the various combinations of materials and methods of application may occur to those of ordinary skill in the art while remaining within the scope of the invention as claimed and equivalents.

What is claimed is:

1. A vehicle suspension comprising:
    a hub for supporting a vehicle wheel;
    a trailing arm secured to the hub and also secured to the body of the vehicle;
    a first lateral arm located, relative to the vehicle, rearward of the rotational axis of the wheel, said first lateral arm being secured to the hub and also secured to the vehicle body and being generally transverse to the longitudinal axis of the vehicle;
    a second lateral arm located, relative to the vehicle, upward of the rotational axis of the wheel and upward of the first lateral arm, said second lateral arm being secured to the hub and also secured to the vehicle body and being generally transverse to the longitudinal axis of the vehicle;
    a third lateral arm located, relative to the vehicle, forward of the rotational axis of the wheel, said third lateral arm being secured to the trailing arm and also secured to the body of the vehicle and comprising a variable stiffness actuator;
    wherein the variable stiffness actuator includes a hydraulic circuit with an electronically controlled orifice where the open state of the orifice provides a fluid flow state in the actuator such that the third lateral arm is in a least stiff state, thus, affecting toe properties of the vehicle wheel.

2. The vehicle suspension of claim 1, wherein the orifice of the stiffness actuator can be placed into a closed condition that provides a fluid flow state in the actuator such that the third lateral arm is in a most stiff state.

3. The vehicle suspension of claim 1, wherein the variable compliance arm is a piston and cylinder system.

4. The vehicle suspension of claim 3, further including means for varying the degree of closing of the actuator orifice via electronic control of the hydraulic valve situated in the fluid passage between the two sides of the piston in the actuator.

5. The vehicle suspension of claim 3, wherein in the cylinder at least two chambers receive hydraulic or pneumatic fluid and are separated from one another by the piston.

6. The vehicle suspension of claim 5, wherein the third lateral arm includes cup springs therein for indirectly seating the piston against surfaces bordering the chambers.

7. The vehicle suspension of claim 1, further comprising vehicle sensors of vehicle wheel loading and vehicle speed and a controller that varies the fluid flow state of the actuator based on vehicle speed and wheel loading.

8. The vehicle suspension of claim 1, wherein the trailing arm is parallel to the longitudinal axis of the vehicle.

9. The vehicle suspension of claim 1, wherein the second lateral arm has a ball joint on one end and a stiff bushing on the other end.

10. The vehicle suspension of claim 1, wherein stiff bushing mounts are provided on either end of the third lateral arm.

11. The vehicle suspension of claim 1, further comprising and vehicle acceleration sensor that controls opening of the orifice of the stiffness actuator.

12. The vehicle suspension of claim 1, wherein the third lateral arm is secured to the trailing arm with a mount comprising a bushing with a longitudinal axis parallel to the longitudinal vehicle axis and the third lateral arm is secured to the body of the vehicle with a mount comprising a bushing with a longitudinal axis parallel to the longitudinal vehicle axis.

13. A method for controlling a vehicle suspension comprising the steps of:
    providing:
        a hub for supporting a vehicle wheel;
        a trailing arm secured to the hub and also secured to the body of the vehicle;
        a first lateral arm located, relative to the vehicle, rearward of the rotational axis of the wheel, said first lateral arm being secured to the hub and also secured to the vehicle body and being generally transverse to the trailing arm;
        a second lateral arm located, relative to the vehicle, upward of the rotational axis of the wheel and upward of the first lateral arm, said second lateral arm being secured to the hub and also secured to the vehicle body and being generally transverse to the trailing arm;
        a third lateral arm located, relative to the vehicle, forward of the rotational axis of the wheel, said third lateral arm being secured to the hub and also secured to the body of the vehicle and comprising a variable stiffness actuator;
    controlling an orifice within the variable stiffness actuator electronically, to fully open a hydraulic circuit, where the open state of the orifice and circuit provides a fluid flow state in the actuator such that the third lateral arm is in a least stiff state.

14. The method for controlling a vehicle suspension of claim 13, wherein the orifice of the stiffness actuator is placed into a closed condition that provides a fluid flow state in the actuator such that the third lateral arm is in a stiff state.

15. The method for controlling a vehicle suspension of claim 14, wherein as vehicle speed increases, the orifice is opened to a greater degree, thus providing a more soft state and more toe-in of the vehicle wheel.

16. The method for controlling a vehicle suspension of claim 13, further including means for varying the degree of closing of the actuator orifice via electronics.

* * * * *

UNITED STATES PATENT AND TRADEMARK OFFICE
CERTIFICATE OF CORRECTION

PATENT NO. : 7,984,915 B2  
APPLICATION NO. : 12/464544  
DATED : July 26, 2011  
INVENTOR(S) : James W. Post, II et al.

It is certified that error appears in the above-identified patent and that said Letters Patent is hereby corrected as shown below:

Title Page, Item (73) Assignee should read as follows:  
Honda Motor Co., Ltd., Tokyo (JP); ZF Friedrichshafen AG, Friedrichshafen (DE)

Signed and Sealed this  
Thirteenth Day of March, 2012

David J. Kappos  
*Director of the United States Patent and Trademark Office*